United States Patent
Sharma et al.

(10) Patent No.: US 8,051,156 B1
(45) Date of Patent: Nov. 1, 2011

(54) MANAGING POWER AND PERFORMANCE

(75) Inventors: Ratnesh Sharma, Union City, CA (US);
Cullen E. Bash, Los Gatos, CA (US);
Chandrakant Patel, Fremont, CA (US);
Chih C. Shih, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 598 days.

(21) Appl. No.: 11/495,360

(22) Filed: Jul. 28, 2006

(51) Int. Cl.
*G06F 15/173* (2006.01)
*G05B 15/00* (2006.01)

(52) U.S. Cl. ........................................ 709/223; 700/276

(58) Field of Classification Search .................. 709/223; 700/726
See application file for complete search history.

(56) References Cited

U.S. PATENT DOCUMENTS

| | | | |
|---|---|---|---|
| 6,728,262 B1 * | 4/2004 | Woram | 370/466 |
| 2002/0007464 A1 * | 1/2002 | Fung | 713/320 |
| 2004/0006652 A1 * | 1/2004 | Prall et al. | 709/318 |
| 2004/0158625 A1 * | 8/2004 | Neale | 709/223 |
| 2004/0177357 A1 * | 9/2004 | Heller et al. | 718/100 |

* cited by examiner

Primary Examiner — Larry Donaghue

(57) ABSTRACT

A method for integrating information technology (IT) data with non-IT data, comprising: first identifying a non-IT network for accessing non-IT data, second identifying an IT network from which to access the non-IT data from the non-IT network, first determining that the non-IT network is accessible via at least one interface based on Object Linking and Embedding for Process Control (OPC) for accessing at least one device in the non-IT network, second determining that the IT network includes an architecture for Simple Network Management Protocol (SNMP) or Web Based Enterprise Management (WBEM) for managing at least one device in the IT network, and providing the IT network with access to data of the at least one device in the non-IT network by accessing the at least one OPC-based interface via either the SNMP-capable architecture or the WBEM architecture of the IT network.

18 Claims, 11 Drawing Sheets

MANAGING POWER AND PERFORMANCE

BACKGROUND

The advent of Internet-based applications and their resulting multi-tier distributed architecture has changed the focus of design for large-scale Internet computing. For example, internet server applications typically execute in a horizontally scalable topology across hundreds or thousands of commodity servers in an Internet data center. Consequently, increasing scale and power density have a significant impact on the thermal properties of a data center and its physical environment. As referred herein, a data center is a location or facility that houses mainly electronic equipment, such as computers and communications equipment, for handling the data necessary for desired operations, such as information technology (IT) operations.

BRIEF DESCRIPTION OF THE DRAWINGS

Embodiments are illustrated by way of example and not limited in the following figure(s), in which like numerals indicate like elements, in which.

DETAILED DESCRIPTION

Figure 1:
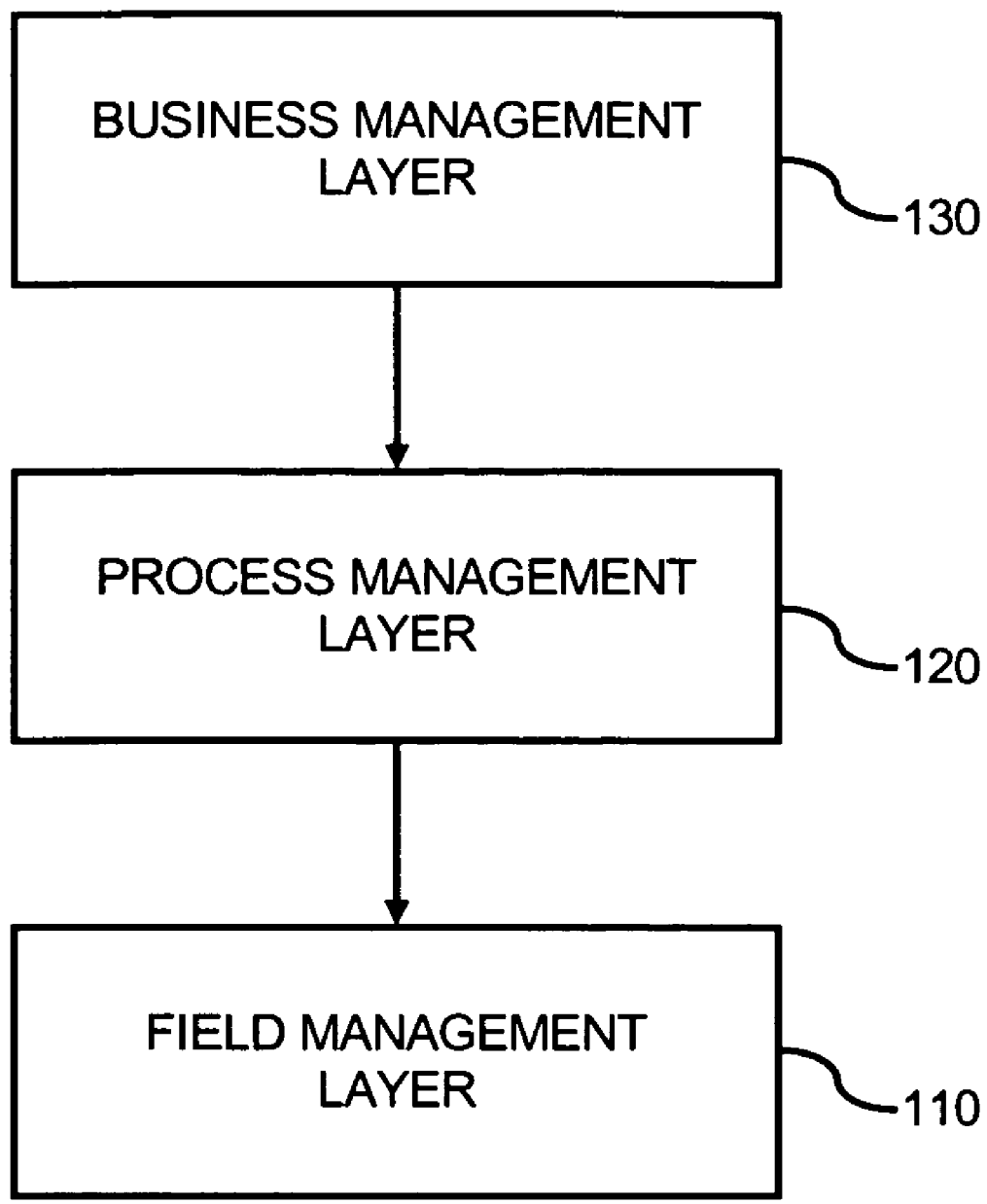
FIG. 1 illustrates a typical information architecture 100 for environmental and energy management of an environment.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Effective thermal management is essential to the robustness of mission-critical applications. For example, typical computer systems and other electronic equipment in a data center include a number of printed circuit boards (PCBs), mass storage devices, power supplies, microprocessors, micro-controllers, and other semiconductor devices that dissipate relatively significant amounts of heat during operation, which in turn can affect the stability and accuracy of such electronic system if left unchecked. Thus, air conditioning units are typically used to cool heated air and to supply cooled air to the electronic equipment. The air conditioning units typically belong to one or more heating, ventilating and air-conditioning (HVAC) systems that form a cooling infrastructure for a data center.

Accordingly, the management of energy as a key resource is a requirement from an economic and sustainability standpoint for the future of utility computing. The design of an information architecture of a physical environment, such as a data center, is key to the overall management, including energy efficient thermal management, of such a physical environment. A typical information architecture for an environment such as a physical data center environment includes: a) a facility management network, such as a distributed control system (DCS) or a supervisory control and data acquisition (SCADA) system, for managing environmental conditions and energy usage of the desired environment; and b) an IT network for the data center that includes IT assets, such as computers, databases, network routers, internet connections, and intranet connections. As referred herein, facility management is the management of buildings and services. Thus, the facility management network is employed to manage the administration, operations, and performance of various physical systems, and field devices therein, that are used to properly maintain the physical environment represented by the information architecture. Examples of such physical systems include but are not limited to cooling infrastructure with HVAC systems therein, security/alarm systems, fire/life safety systems, elevators/escalators systems, main/auxiliary power systems, and other mechanical/electro-mechanical systems. Most facility management networks are purpose-built networks with proprietary network protocols. Typically, a user accesses and manages a facility management network with an associated proprietary facility management control system that is both hardware and software driven. Examples of a facility management control system include APOGEE by Siemens AG of Germany; FORESEER by DataTrax of Raleigh, N.C.; Metasys by Johnson Controls, Inc. of Milwaukee, Wis.; and COMFORTPOINT by Honeywell of Morristown, N.J. Because of the proprietary nature of facility management networks, it is often difficult or tedious to design around the associated facility management control system in order to gain access to data or information about such networks.

On the other hand, the IT network is employed to manage IT aspects in the physical environment that is represented by the information architecture. As conventionally understood, IT refers to the management and processing of information with IT hardware, software, or both. Thus, IT aspects deal with the use of IT assets to transmit, receive, retrieve, store, protect, and process information and with the networking of such IT assets for such use. Accordingly, as referred herein, IT data includes data pertaining to the IT network.

A user typically accesses and manages an IT network with an IT network management software. Examples of IT network management software include OPENVIEW of Hewlett Packard Company (HP) of Palo Alto, Calif., TIVOLI from IBM Corporation of Amonk, N.Y., and UNICENTER TNG from CA, Inc. (formerly, Computer Associates, Inc.) of Islandia, N.Y. A typical IT network management software employs different management protocols, such as the Simple Network Management Protocol (SNMP), or different management schemes, such as Web Based Enterprise Management (WBEM), to obtain IT data from and get notification of events that happen in the IT network. As referred herein, users wishing to access or manage the IT network through the IT asset management software include IT managers, system administrators, or any other IT personnel or entities that are interested in managing an IT network and IT assets therein.

FIG. 1 illustrates a typical information architecture 100 for environmental and energy management of an environment, such as a data center, in which the methods and systems described herein are applicable. The information architecture 100 includes three layers: a field management layer 110, a process management layer 120, and a business management layer 130. Although a data center is used throughout the present disclosure as a prime example of a physical environment, it should be understood that embodiments in the present application are applicable to any other physical environment that has an IT network and any other non-IT network that is desired or required to be integrated with the IT network for data sharing. Examples of other physical environments include offices, office buildings, corporate parks, corporate headquarters, homes, schools, or any other entities networked together for sharing of IT and other resources.

The field management layer 110 includes "smart" field devices that provide a consistent access to a wide range of process-related, device-related, and network-related data. Thus, in an information architecture, field devices exist in both the facility management network and the IT network. Examples of field devices in a facility management network include Human-Machine interfaces (HMIs) (that is, user interface or UI), Programmable Logic Controllers (PLCs), etc. for local control/access of computer room air conditioning (CRAC) units, Variable Frequency Drives (VFDs), power distribution units (PDUs), uninterruptible power supplies (UPSs), and a broad range of other sensors (such as thermostats or temperature sensors) and actuators and the like. Examples of field or network devices in an IT network for providing IT services include hosts, routers, gateways, terminal servers, and other IT assets.

The process management layer 120 includes one or more of the aforementioned facility management control system, such as a DCS or a SCADA system, for monitoring and controlling processes and providing access to historical data and analysis as provided by the field management layer 110. At the top of the information architecture 100 is the business management layer 130, which provides integration of the information collected from those processes monitored and controlled by the process management layer 120 into business systems that manage the financial aspects of these processes. The key of the information architecture 100 is an open and effective communication architecture concentrating on data access and event handling.

As noted earlier, the information structure 100 includes an IT network, which supports and implements the field devices found in the field management layer 110, the control systems found in the process management layer 120, and the business systems found in the business management layer 130. The IT network, in turn, is managed by an IT network management software. Currently, however, there is no communication between IT management software, such as HP OPENVIEW, and facility management software, such as software associated with Siemens APOGEE, employed in a physical data center environment. Because there is no way to easily integrate facilities data (or other non-IT data) with IT data, each data set is kept separate, with decisions made in one venue (IT or facilities) potentially having negative impact on the other. Consequently, it is very difficult to effectively schedule maintenance, data center upgrades or plan for failure mitigation in such a physical data center environment. Accordingly, methods and systems for providing a mechanism for integrating facilities environmental data with standard IT management software are described herein.

SNMP-Capable Architecture

Figure 2:
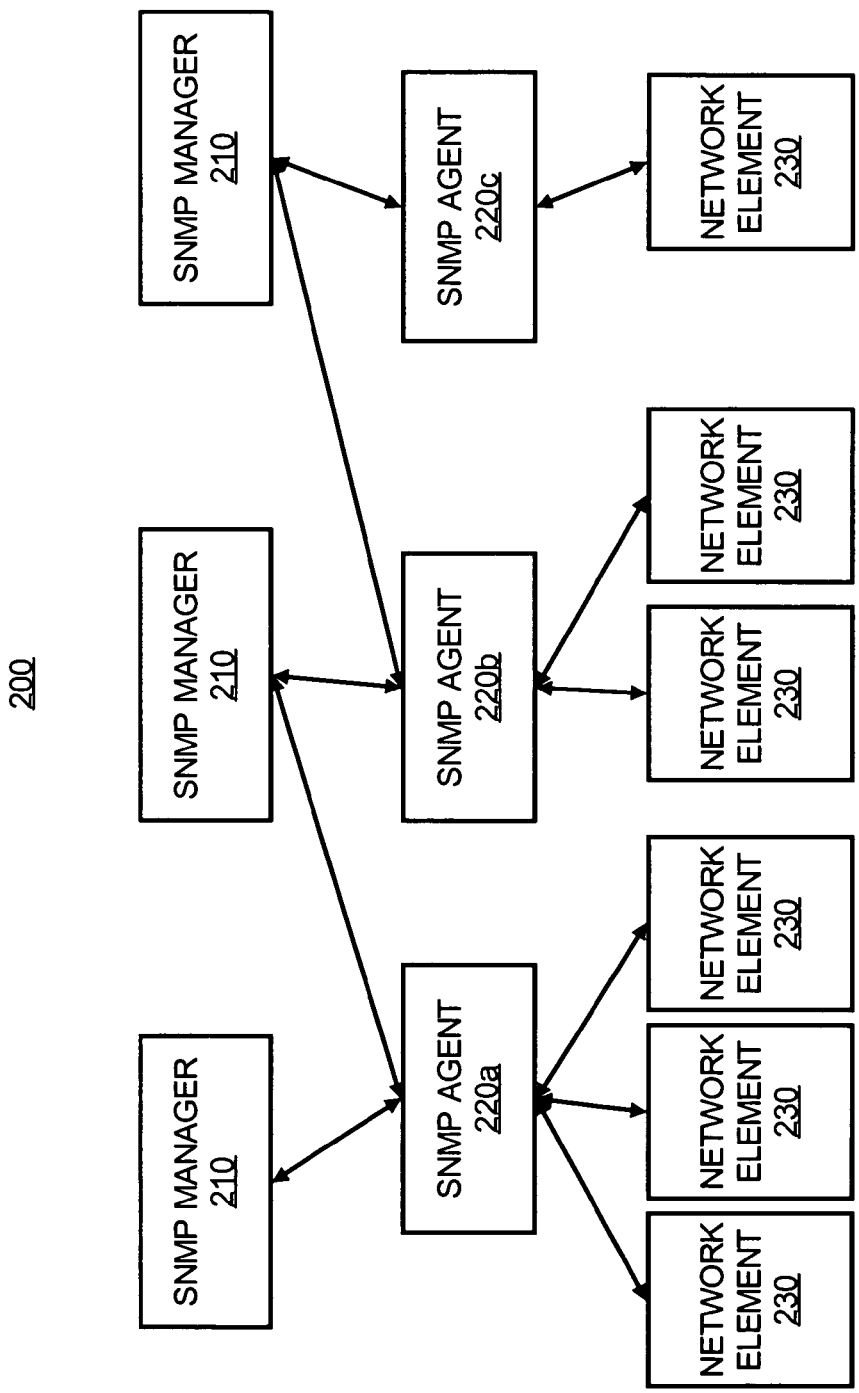
FIG. 2 illustrates a typical OPC architecture.

Implicitly, a typical IT network management software models an IT network as a collection of network management stations (or network managers) and network elements in a network or architecture. It then employs a management protocol, such as the Simple Network Management Protocol (SNMP), to communicate management information between the network management stations and the network elements. FIG. 2 illustrates a typical SNMP-capable (or SNMP-enabled) architecture 200 set up by a standard IT network management software to manage an IT network. The SNMP-capable architecture 200 includes one or more network managers 210, one or more management, or SNMP, agents, 220, and one or more network elements 230. The network managers 210 execute management applications to monitor and control the network elements 230. Thus, each SNMP manager 210 contains one or more management functions and presents IT management information to the user of the IT asset management software. The network elements 230 represent physical devices such as hosts, routers, gateways, terminal servers, and the like that are typically found in an IT network. Each network element 230 is SNMP-capable so that it can communicate with and provide information to a SNMP manager 210 via a SNMP agent 220.

To be SNMP-capable, that is, visible in the SNMP-capable architecture 200, each device or network element 230 in the SNMP-capable architecture 200 is defined by a management information base (MIB), which is a database or data file that defines the device, or network element, as a set of one or more managed objects (MOs), through object identifiers. A MO is a parameter, attribute, or characteristic of the network element that is monitored by a SNMP agent 220. A MO can be implemented as a programming code or programming object. A MIB is stored in each SNMP manager 210 to make visible those network elements 210 to which such a SNMP manager 210 has access via a SNMP agent 220. Hence, the SNMP-capable architecture 200 is extensible by design through the addition of MOs for new devices or network elements in the MIB. Instances of MOs, that is, current values of the parameters or attributes that constitute the MOs, are stored in the SNMP agents 220. Thus, a SNMP manager 210 perceives a SNMP agent 220 as a virtual data store or cache that is populated with instances of MOs of those network elements 230 that such a SNMP agent 220 processes. In turn, each SNMP agent implements SNMP, stores and retrieves management data from network elements 230 as defined by the MIB in a SNMP manager 210, and performs network management functions requested by a SNMP manager 210 based on the stored or retrieved management data.

Although the SNMP agents 220 are illustrated in FIG. 2 as being separate from the network elements 230, it should be understood that the SNMP agent typically resides in a network element 230. Two or more network elements 230 can have the same SNMP agent 220 or different SNMP agents 220. Thus, for example, as illustrated in FIG. 2, three network elements 230 have the same SNMP agent 220a, which resides in each of these three network elements 230. Likewise, as illustrated, two network elements 230 have the same SNMP agent 220a, which resides in each of these two network elements 230. Whereas, as illustrated, only one network element 230 includes the SNMP agent 220c residing therein. FIG. 2 also illustrates that each network element 230 can be accessed, via its SNMP agent 220, by one or more SNMP managers 210. Likewise, each SNMP manager 210 can contact one or more network elements 230.

Each network element 230 is operable to initiate communication with a SNMP manager 210 via its SNMP agent 220, which then sends traps, which are messages initiated by the SNMP agent 220 to the SNMP manager 210. Examples of a trap includes special events, such as failures of links, that a SNMP agent 220 of a network element 230 sends to the SNMP manager 210 to notify the user of the IT asset management software that there is a failure of a communication link between the particular network element 230 and the particular SNMP manager 210.

The IT network management software is typically implemented by a computerized system that is connected to the IT network that is being monitored and managed by such a software. Examples of a computerized system include but are not limited to one or more desktop computers, one or more laptop computers, one or more mainframe computers, one or more networked computers, one or more processor-based devices, or any similar types of systems and devices. Thus, such a computerized system includes one or more processors of any of a number of computer processors, such as processors from Intel, Motorola, AMD, Cyrix. Each processor is coupled to or includes at least one memory device, such as a computer readable medium (CRM). The processor is operable to execute computer-executable program instructions stored in the CRM, such as program code of applications, to run the applications. The computer-executable program instructions include code from any suitable computer-programming language, such as C, C++, C#, Java, or the like. Embodiments of a CRM include, but are not limited to, an electronic, optical, magnetic, or other storage device capable of providing a processor of the server with computer-readable instructions. Other examples of a suitable CRM include, but are not limited to, a floppy disk, CD-ROM, DVD, magnetic disk, memory chip, ROM, RAM, an ASIC, a configured processor, any optical medium, any magnetic tape or any other magnetic medium, or any other medium from which a computer processor is operable read instructions.

Accordingly, the IT network management software, including its SNMP managers 210, can be implemented as computer-executable program instructions of one or more software programs or modules stored on a CRM accessible by the computerized system for execution by its processor(s). Whereas, each SNMP agent can reside in a network element 230 as computer-executable program instructions of one or more software programs or modules stored on a CRM in the network element 230.

SNMP-Capable Architecture with Proxy Agents

Figure 3:
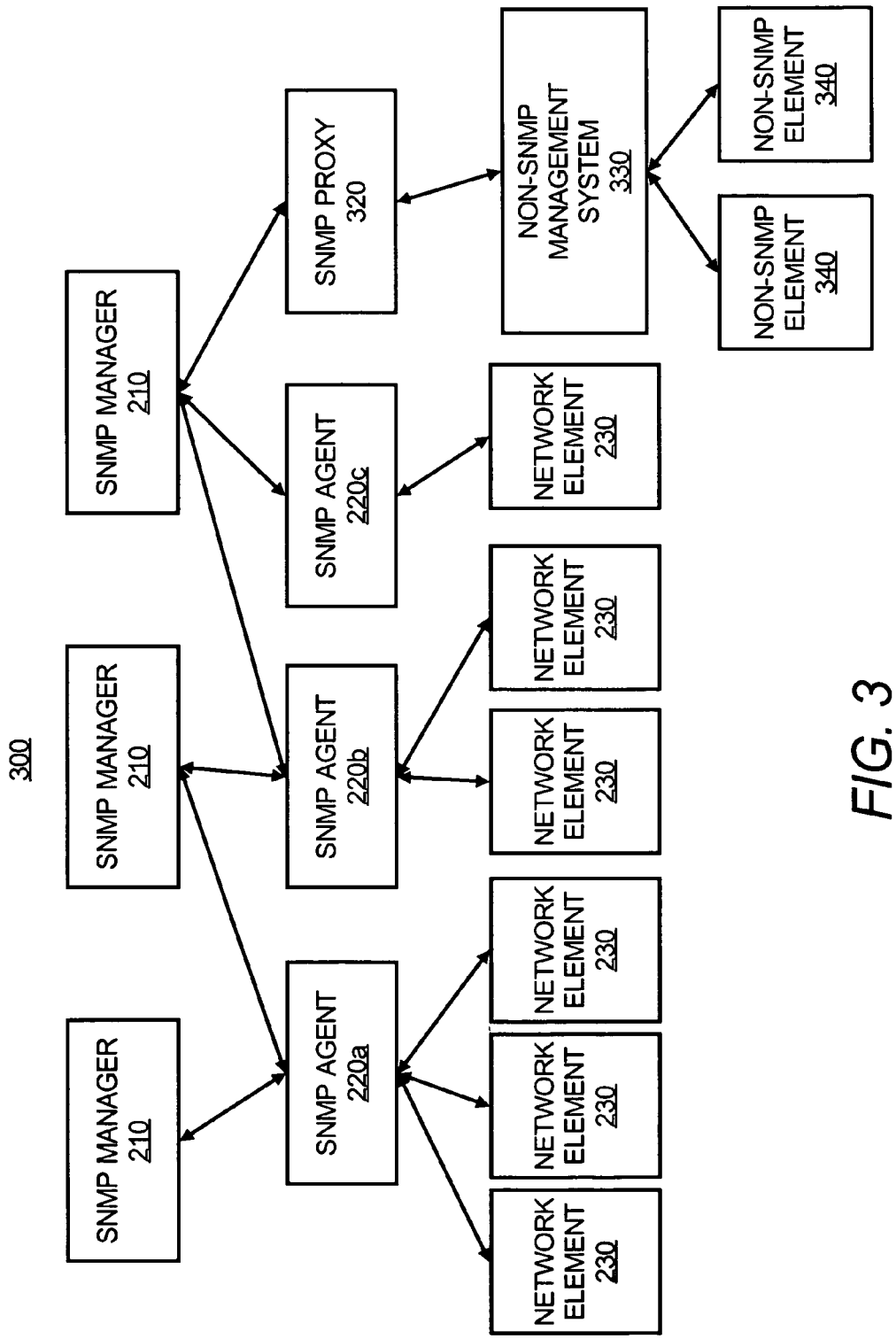
FIG. 3 illustrates a typical SNMP-capable architecture.

Unlike network elements in an IT network, most field devices 230 and 240 in a facility management network are not SNMP-capable. This is because either such field devices are not managed by a computer process for IT purposes, or they are managed using a non-SNMP protocol or with limited SNMP support. Typically, SNMP proxy agents are employed in a SNMP-capable architecture to allow access to remote information about devices that are not SNMP-capable. FIG. 3 illustrates a typical SNMP-capable architecture 300, which the SNMP-capable architecture 200 in FIG. 2 expanded to further illustrate the use of SNMP proxy agents. As with the SNMP-capable architecture 200, the SNMP-capable architecture 300 includes one or more SNMP managers 210, one or more SNMP agents 220, one or more SNMP-capable network element 230. In addition, the SNMP-capable architecture 300 includes one or more SNMP proxy agents 320 (only one is illustrated) for accessing a non-SNMP management system 330, and those non-SNMP managed elements 340 thereof.

The non-SNMP management system 330 (and its managed elements 340) can be, for example, the facility management control system typically found in an information architecture, as discussed earlier. The communication protocol between the SNMP proxy agent 320 and the non-SNMP management system 330 is often proprietary because it depends on the proprietary specifications of the latter. Thus, the SNMP proxy agent 320 includes a MIB that reflects the proprietary management information on the "real agent" of each managed element 340 in the non-SNMP management system 330. These real agents are the actual destination agents that the SNMP managers 210 desire to reach. Consequently, the typical SNMP proxy architecture 300 remains dependent on the proprietary nature of the non-SNMP management system 330. When there are multiple proprietary non-SNMP management systems, the SNMP proxy agent 320 must then keep track of multiple proprietary protocols, or multiple SNMP proxy agents 320 are needed, each keeping track of a particular proprietary protocol of the non-SNMP management system 330 that it is designed to access.

OPC Architecture

In one embodiment, available functionality of an Object Linking and Embedding (OLE) for Process Control, or OPC, is leveraged to provide a robust technique for accessing data from and communicating facilities data to field devices in the field management layer 110 in an information architecture 100 (FIG. 1) and integrating such facilities data with IT data. OPC provides a standard mechanism for communicating to numerous data sources, such as field devices and IT databases. It draws a line, that is, provides an interface, between hardware providers and software developers. Thus, the application of an OPC architecture eliminates the propriety of a typical facility management network and brings it to a standard level. It provides a set of connectivity standards for communicating data from a data source to any client application in a standard way with a standard set of application programming interfaces (APIs), standard commands, and standardized events.

The OPC architecture further leverages the advantages of the component object model (COM) interface or the .NET Framework component from Microsoft to provide a user with one or more OPC servers for: a) Online DataAccess (DataAccess), for efficient reading and writing of current data between an application and a process control device flexibly and efficiently; b) Alarm and Event Handling (Alarm&Event) mechanisms or interfaces for OPC Clients to be notified of the occurrence of specified events and alarm conditions, to determine the events and conditions supported by an OPC server, and to obtain the current status of such events and conditions; and c) Historical Data Access (HistoricalData) mechanisms or interfaces for the reading, processing and editing of data of a historian engine. OPC DataAccess, Alarm&Event, and HistoricalData functionalities can be implemented together in a single OPC server or separately in different OPC servers. Hence, a user is able to develop reusable, highly optimized OPC servers to communicate to data sources, and maintain a standard mechanism to access data from the data sources efficiently with standard commands and to take such data sources through standardized events. As understood in the art and referred herein, a server is any computerized system that provides services to other computerized or computing systems (clients) over a network.

Accordingly, each OPC server provides an OPC interface to allow any client to access its devices, regardless of the manufacturer(s) of such devices. One side of the OPC server is the proprietary side of the hardware providers with their specific logic or protocol to communicate with their proprietary devices. The other side of the OPC server is the application side of the software developers, whereby one or more standardized OPC interfaces are provided for the software developers to access the proprietary devices through the specific logic or protocol without the need to fully understand the make-up of such specific logic.

As noted above, an OPC server is provided with DataAcess functionality to provide a robust gateway for accessing facilities data and communicating such data to field devices in a facility management network. A typical OPC server includes an OPC server object, one or more OPC group objects, and one or more OPC item objects for providing DataAccess. The OPC server object maintains information about the OPC DataAccess server and stores OPC group objects. In turn, each OPC group object maintains data about itself and provides a mechanism for storing and logically indexing or organizing OPC items. Within each OPC group object are OPC item objects that can be defined by an OPC client application. Each OPC item object represents a connection to a data source, such as a field device in the facility management network, and not the data source itself. From the application side of the OPC DataAccess server, an OPC item object is not accessible by an OPC client application. Thus, there is no external interface defined for an OPC item object. All access to OPC items is via an OPC group object that stores or maintains the OPC item object, or simply where the OPC item is defined. Likewise, OPC Alarm & Event interfaces in an OPC server include OPC objects for notifying OPC clients of specified alarms, specified conditions, specified events, or any combinations thereof. And OPC HistoricalData interfaces in an OPC server include OPC objects for accessing any historical data stored in the OPC architecture that relates to a component of the OPC architecture. The aforementioned OPC objects in one or more OPC servers are OPC software or programming objects residing in the CRMs of the OPC servers. Typically, these OPC objects are programming objects based on component object model (COM).

Figure 4:
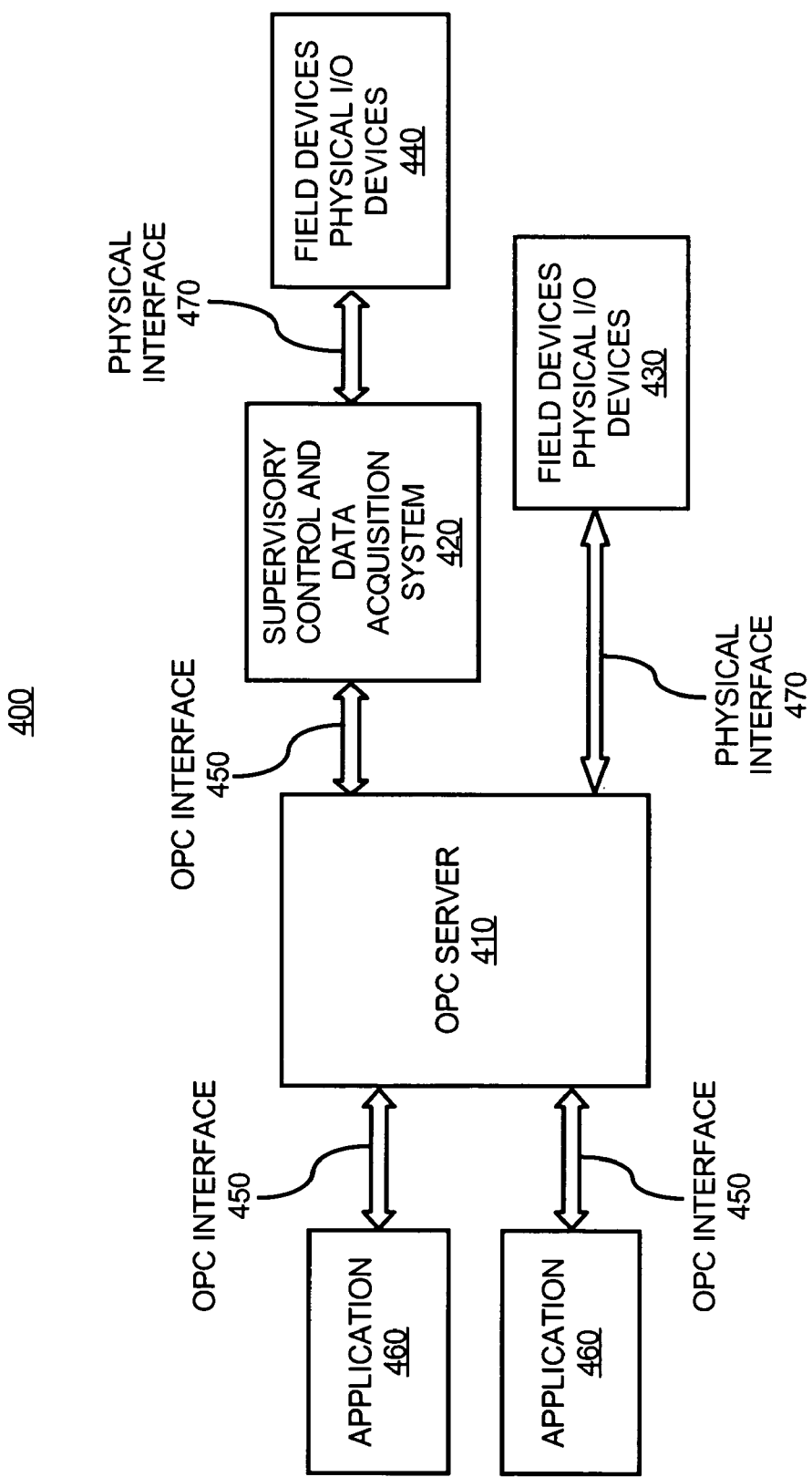
FIG. 4 illustrates a typical OPC architecture.

Although a typical OPC architecture is primarily designed for accessing data from a networked server, OPC interfaces are useable in many places within an application. At the lowest level they are operable to retrieve raw data from the physical devices to any DCS or SCADA system, or from such a system into a client application. FIG. 4 illustrates a typical OPC architecture 400 that includes an OPC server 410, which is coupled to one or more OPC interfaces 450 for transferring data as received from a control system, such as the SCADA system 420, to one or more client applications 460. The OPC server 410 is any server that provides OPC interfaces for OPC DataAccess functionality, Alarm&Event functionality, HistoricalData functionality, or any combination thereof. The SCADA system 420 is also able to retrieve raw data from physical devices, such as physical I/O or field devices 440, through the OPC server 410 and OPC interfaces 450, or through a physical interface 470. A proprietary physical interface or a standard physical interface 470 (such as, ModBus, LonTalk, etc.) is provided. The design of the OPC architecture 400 also makes possible the OPC Server, such as the OPC server 410, which allows a client application 460 to access data from many OPC servers provided by many different OPC vendors running on different nodes via a single defined object. As noted above and with reference to the information architecture 100 in FIG. 1, the field devices 430 and 440 are in the field management layer 110, and the SCADA system 420 is in the process management layer 120.

Integration of SNMP-Capable and OPC Architectures

With the OPC architecture providing a standard gateway to access the facility management (FM) network in an information architecture, IT personnel can retrieve data and notifications of events in the FM network via the IT network. Facilities view is desired by IT personnel because effective environmental management, such as thermal management, is essential to the robustness of mission-critical applications, and the management of energy as a key resource is a requirement from an economic and sustainability standpoint for the future of utility computing.

Accordingly, methods and systems are described herein to provide an integration of non-IT, FM information into a Service-Oriented Architecture (SOA), where the data and logic of such FM information can be obtained or shared across multi-tiered environments using industry standard interfaces. In embodiment, with access to the FM network, IT personnel is provided with the ability to manage the cooling infrastructure for a data center and adjust cooling devices, such as AC units, fans, thermostats, volume air-handling units, and Building Automation and Control (BAC) boxes, therein via the IT network. Thus, a user with access to the IT network can further coordinate thermal management with utility computing management in a data center to provide efficient energy management for the data center. For example, increased cooling and ventilation are desired for the data center during peak computing periods to maintain the stability and accuracy of the electronic equipment. On the other hand, decreased cooling and ventilation are desired for the data center during off-peak periods and down times to conserve energy.

Figure 5:
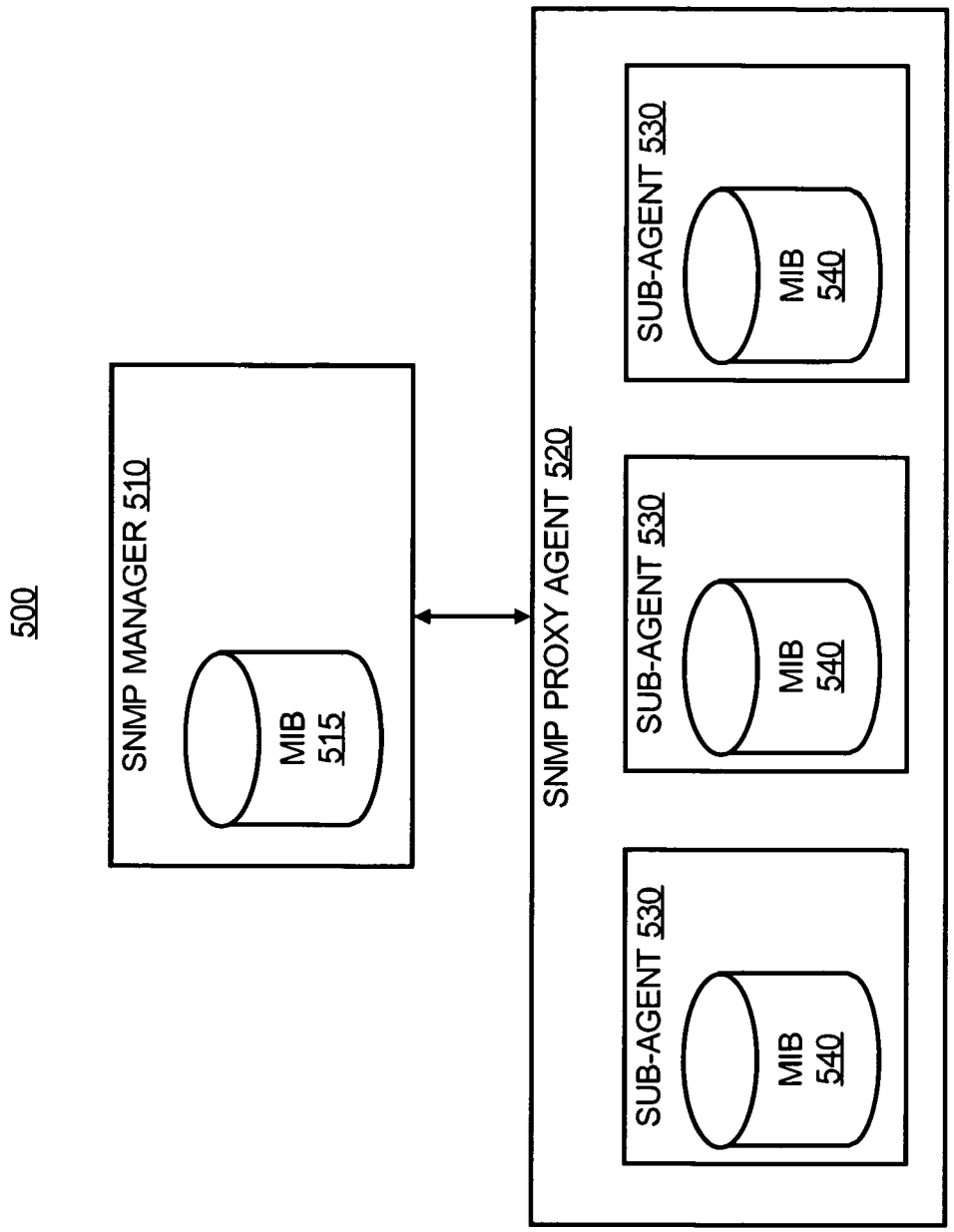
FIG. 5 illustrates a SNMP framework that can be integrated into an existing SNMP-capable architecture, such as the one shown in FIG. 4 in accordance with one embodiment of the present invention.

Accordingly, in one embodiment, the SNMP and OPC architecture are employed together to integrate an IT network with a facility management network in an information architecture in order to provide communication between the IT management software and facility management software for the exchange of network information. Because field devices in the facility management network are typically not SNMP-capable, the aforementioned SNMP proxy-agent architecture is leveraged to create SNMP proxy agents for such field devices. Thus, it is possible to create SNMP proxies for systems that do not support SNMP by obtaining the non-SNMP system's data through an extensible SNMP agent system. For example, the HP OPENVIEW Extensible SNMP Agent software can be employed to implement a SNMP proxy agent that enables rapid development of instrumentation to manage proprietary data. FIG. 5 illustrates a SNMP framework 500 that can be integrated into an existing SNMP-capable architecture, such as the OPC architecture shown in FIG. 4, to enable integration of an OPC architecture for a physical environment, such as a facility management network, with a SNMP-capable IT network according to one embodiment.

Referring to FIG. 5, the integrated framework 500 includes a SNMP manager 510, which is a network manager in a SNMP-capable architecture for an IT network similar to the SNMP manager 210 illustrated in FIG. 2. Although only one SNMP manager 510 is illustrated, it should be understood that more than one SNMP manager 510 potentially exist in the integrated framework 500, similar to FIG. 2. The integrated framework 500 further includes a SNMP proxy agent 520 for accessing information about a non-SNMP management system, such as a facility management network, and those managed elements, such as field devices, therein. The SNMP proxy agent 520 includes one or more SNMP proxy sub-agents 530 for accessing the facility management network. Each SNMP proxy sub-agent 530 is tasked with accessing a portion of or the whole facility management network, as desired, based on the managed objects contained in its MIB 540. Thus, the MIB 540 of each SNMP proxy sub-agent 530 determines how much visibility the SNMP-capable IT network will have of the non-SNMP devices in the facility management network. In other words, non-SNMP devices do not have their own MIBs and appear on the SNMP-capable IT network because their MOs are listed in the MIB of a SNMP proxy agent or sub-agent within the SNMP proxy-agent.

Accordingly, in one embodiment, the SNMP proxy agent 520 is an extensible SNMP agent system that enables rapid development of instrumentation to manage proprietary data of the facility management network. This is because each SNMP proxy sub-agent 530 can be used to access a different non-SNMP system. As new non-SNMP systems are desired to be visible through the IT network, additional SNMP proxy sub-agents 530 can be added in the SNMP proxy agent 520 to access those new systems via OPC interfaces, as further described below.

Figure 6:
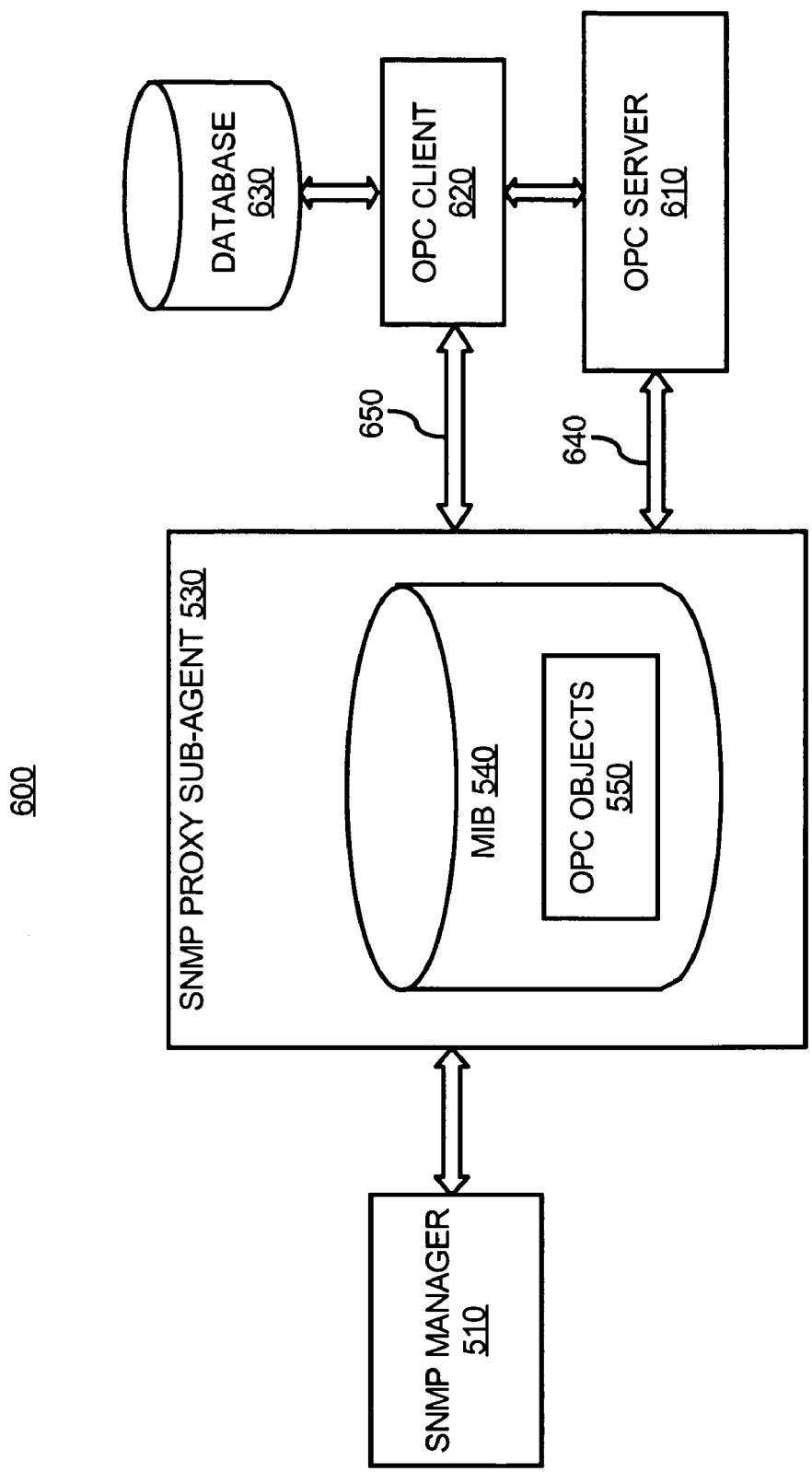
FIG. 6 illustrates an application of a SNMP proxy subagent in accordance with one embodiment of the present invention.

FIG. 6 illustrates the application of a proxy-subagent 530 in FIG. 5 to leverage the OPC architecture of the facility management network in order to access information therein. In one embodiment, new MOs for the integrated SNMP framework 500 are defined as existing OPC programming objects 550 for those field devices in the facility management network that are desired or required to be SNMP-capable or visible to the integrated SNMP framework 500. In one embodiment, the field devices are those typically found in a cooling infrastructure. Examples of such field devices include HMIs (e.g., thermostats), PLCs for local control/access of CRAC units, VFDs and PDUs for driving HVAC systems, and volume air-handling units in HVAC systems. Thus, the new MOs represent parameters, attributes, or characteristics of such field devices. As understood in the art, the MOs are defined by the Structure of Management Information (SMI) based on the particulars of the field devices.

Accordingly, the new MOs are defined as existing OPC server objects, group objects, and item objects in an existing OPC DataAccess server of the facility management network, as any OPC programming objects associated with the existing OPC Alarm&Event server, any OPC programming objects associated with the existing OPC HistoricalData server, or any combinations thereof. The new MOs are then arranged as object identifiers in a new MIB subtree (or subset), which may be stored in a MIB 540 of a respective SNMP proxy sub-agent 530. The new MIB subtree extends the already-existing MIB 515 in the SNMP manager 510. Alternatively, the new MIB subtree is incorporated into the MIB 515 within the SNMP manager 510. Accordingly, it is possible for the SNMP proxy sub-agent 530 to specify commands for each OPC object 550 that utilize the OPC interface to obtain data from an existing OPC server 610, which can then access data from field devices, a DCS, a SCADA, or any combination thereof (illustrated in FIG. 3) via path 640. Furthermore, the SNMP proxy sub-agent 530 is able to read from a file or query a database 630 that has already been created by an OPC client 620 via path 650. Furthermore, event-based notification system can be setup in both paths 640 and 650 to handle alarms and change of value of sensors and actuators in the field devices of the facility management network. Thus, potentially, each SNMP proxy sub-agent 530 illustrated in FIG. 5 is used to access a particular OPC server 610. For example, one SNMP proxy sub-agent 530 is for accessing an OPC DataAccess server, one for accessing an OPC Alarm&Event server, and one for accessing an OPC HistoricalData server, whereby these three OPC servers can belong to an OPC architecture of a single non-IT network or to multiple OPC architectures of multiple different non-IT networks. Furthermore, when only one OPC server is desired or required to be accessed (for example, when a single OPC server is able to provide DataAccess, Alarm&Event, and HistoricalData functionalities), SNMP proxy sub-agents 530 are not required. Instead, the SNMP proxy agent 520 itself can maintain an MIB 540 and functions likes a SNMP proxy sub-agent 530 to access the OPC server. Alternative embodiments are contemplated wherein multiple OPC servers may be accessible by a single SNMP proxy sub-agent 530 or a single SNMP proxy agent 540 with the use of sub-agents 530 therein.

Because the SNMP proxy sub-agents 530 contain critical information about the field devices or applications that they manage through their management interfaces, SNMP authentication is desired to safeguard such critical information and allow only authorized access to and operations on such information. As understood in the art, there are available different versions of SNMP, and SNMP implementations often support multiple of such versions. Thus, in one embodiment, the SNMP version (versions) that are implemented for the integration of the SNMP-capable architecture with the OPC architecture depend on the version (or versions) that are in use in the SNMP-capable architecture prior to such an integration. Furthermore, SNMP authentication associated with the initially implemented with the SNMP version (or versions) are also employed to restrict access to the integrated architecture to authorized users and ensure security from hackers and trespassers.

Figure 7:
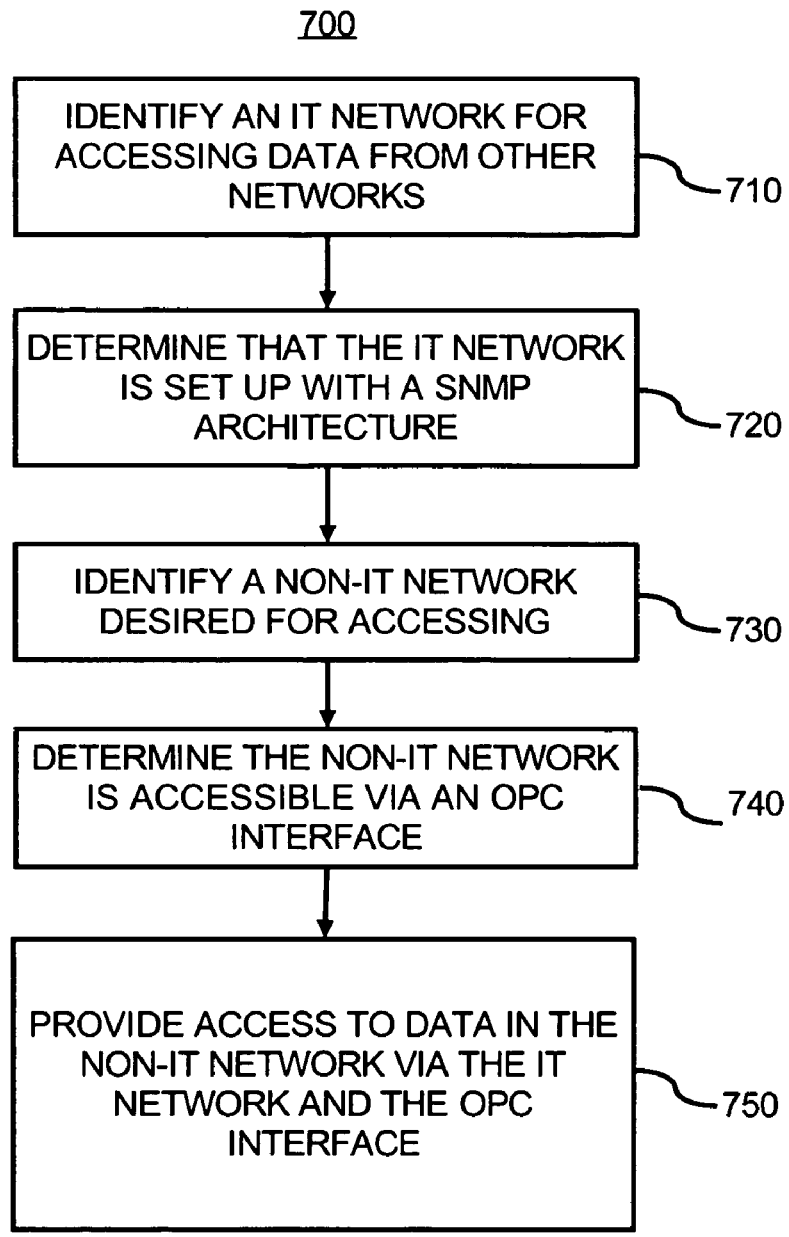
FIG. 7 illustrates a process flow for integrating IT data and non-IT data in accordance with one embodiment of the present invention.

FIG. 7 illustrates a process 700 for integrating facilities data, or any other non-IT data from a non-IT network, with IT data in an IT network to enable a holistic view of an overall information architecture of a physical environment, from its external environment to its network and workload distribution, in a single location, for better management.

At 710, an IT network of a desired physical environment to be monitored is identified and chosen as the IT network for accessing data from other networks, IT or non-IT. The identification can be done manually by the user upon observing and analyzing the physical environment. Alternatively, the identification can be done by an IT network management software, such as HP OPENVIEW, running on a computerized system that is connected to the IT network for analysis.

At 720, it is determined whether a SNMP-capable architecture has been set up for the IT network. In other words, it is determined whether the IT network is SNMP capable or enabled. Typically, if the IT network has been analyzed by an IT network management software, such as HP OPENVIEW, it has been set up with a SNMP-capable architecture for the analysis. Otherwise, a SNMP-capable architecture for the IT network should be set up with software such as an IT network management software.

At 730, an interested non-IT network of the physical environment is identified. This can be accomplished by using any commercially-available management software or one associated with such a non-IT network. For example, if the interested non-IT network is a facility management network, a commercially-available management software such as Siemens APOGEE can be used.

At 740, it is determined whether the interested non-IT network is accessible via an OPC interface. This determination can be done manually by the user checking to see, for example, whether there exists an OPC server providing an OPC interface. Alternatively, this determination can be automated through implementation of a software program at the IT network to determine whether communication can be established with an OPC server at the non-IT network or interfacing with the non-IT network. If an OPC interface is not available, an OPC interface should be set up in a manner described earlier with reference to FIG. 6 so that a SNMP proxy agent subsequently can be set up at the IT network to access the OPC interface and the non-IT network beyond.

At 750, the user is provided access to the non-IT network and data therein via the SNMP-capable architecture set up for the IT network and the OPC interface set up for the non-IT network. This entails adding a SNMP proxy agent to the SNMP-capable architecture of the IT network, storing OPC programming objects found in one or more OPC servers that were set up to provide an OPC interface to the non-IT network as MOs in the SNMP proxy agent so that data from devices or elements from the non-IT network can be retrieved by the user at the IT network through their represented MOs found in the SNMP proxy agent.

With facilities data available through the SNMP proxy agent 520 and one or more SNMP proxy subagents 530 therein, IT personnel is able to access and use feedback of such data to better understand the environmental effects of IT application deployments, such as thermal effects and power consumption, and make better decisions on how to deploy IT applications for energy-efficient thermal management. Any one of such applications is capable of addressing a message directly to the destination (foreign) agent, whereby a SNMP application programming interface (API) in the SNMP manager 510 is operable to determine which host is the proxy and send the message accordingly.

Web Based Enterprise Management (WBEM) Architecture

There also exist IT network management software, such HP WBEM Services Software Developers Kit, that sets up a WBEM architecture for user to manage an IT network. As known in the art, WBEM is an industry-initiated systems management architecture initiative for accessing and sharing management information in an enterprise network. The WBEM architecture has been standardized by the Distributed Management Task Force (DMTF), a standards organization founded in 1992 by various organization and companies. Because a WBEM architecture is operable to manage many types of system, including computer networks, it is operable to manage an IT network as well. The WBEM architecture is capable of providing a common management interface to the IT network so as to simplify and reduce the cost of management.

Figure 8:
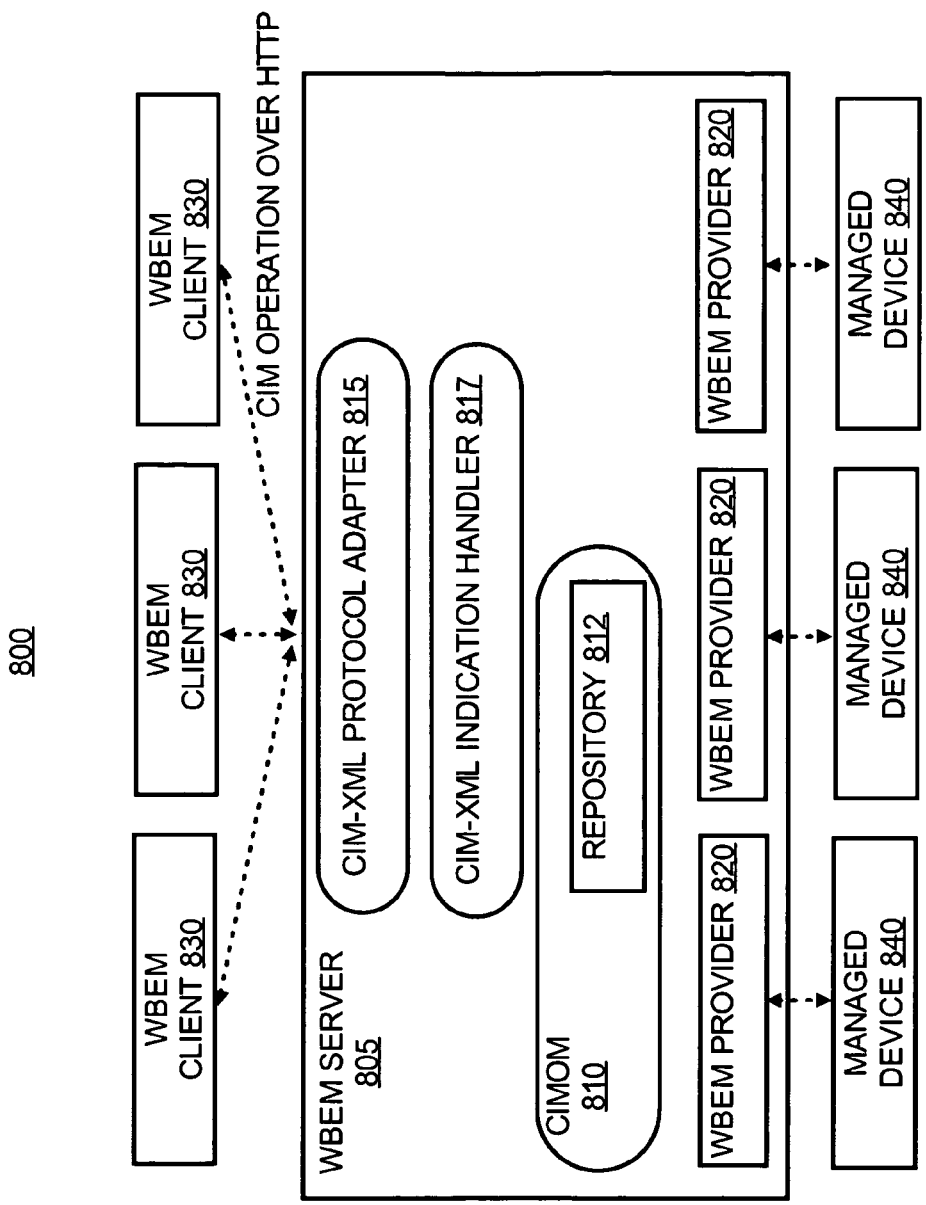
FIG. 8 illustrates a typical WBEM architecture for a network.

FIG. 8 illustrates a typical WBEM architecture 800 that can be set up by a standard IT network management software to manage an IT network. As understood in the art, the WBEM architecture 800 is made up of the following standards: a Common Information Model (CIM), CIM in eXtensible Markup Language (XML), and CIM operations over Hyper-Text Transport Protocol (HTTP). With regard to CIM operations over HTTP, they are also applicable to HyperText Transport Protocol Secured (HTTPS). Thus, any discussion of HTTP with regard to the WBEM architecture 800 is also applicable to HTTPS. The WBEM architecture 800 also includes the following components: a CIM Object Manager (CIMOM) 810, one or more WBEM providers 820, and one or more WBEM clients 830. The aforementioned WBEM standards and components are summarized below with reference to FIG. 8. Further details are found at http://www.dmtf.org of the DMTF.

CIM and CIMOM

A CIM is an object-oriented data model for describing various entities (such as computing and business entities) in Internet, enterprise, and service provider environments. It enables application developers to code their client applications so that such applications may interact with the CIMOM 810 using a predefined, platform independent, set of Application Program Interfaces (APIs). This enables the CIMOM 810 to startup and load any CIM-compliant managed device 840 via a WBEM provider 820, which is a piece of software code that can call whatever routines needed to gather data in order to provide the necessary objects in a CIM schema. The CIMOM 810 includes a repository 812, which stores all CIM schemas used to verify that data sent by the WBEM providers 820 and WBEM clients 830 are correct.

A CIM schema is a collection of related CIM classes. Each CIM schema includes a core model and a common model to provide an actual model's descriptions, captures notions that are applicable to common areas of management, and is independent of implementation. The core model is an information model that captures notions that are applicable to all areas of management. Thus, it is a management model that describes some basic classes that can be applied in any management system, and every management model in CIM can use this schema as a base, that is, inherit from the classes in the core model. The common model is an information model that captures notions that are common to particular management areas, but independent of a particular technology or implementation. There are various standard CIM schemas that have been defined by the DMTF, each standard CIM schema also includes a standard common model predefined by the DMTF. Examples of a standard common model include a computer network model, a devices model, a databases model, and an operating systems model. Additional CIM schemas called extension schemas can be created as needed by extending as desired one of the standard CIM schema for a common model published by the DMTF and found at http://www.dmtf.org.

A typical CIM includes components or elements, such as classes (and subclasses), properties, methods, qualifiers, associations, and instances, that are defined or specified in a text format called Managed Object Format (MOF). It is also possible to represent the CIM in XML or in a visual format, such as the Uniform Modeling Language (UML) format. As indicated earlier, CIM in XML is one of the three WBEM standards. The CIM provides a consistent definition and structure of management information for the WBEM, which includes protocols, query languages, discovery mechanisms, mappings, to name a few, that are needed to exchange CIM information in an interoperable and efficient manner that is independent of the device or devices being managed. Thus, CIM can be used to model computer elements, organization structures, organic materials, physical buildings, etc. In the case of an IT network, the WBEM architecture 800 can be set up with the standard CIM schema for "Network," which is already published by the DMTF, stored in the repository 812 of the CIMOM 810.

The CIMOM 810 is configured such that it can determine which WBEM provider 820 is providing the desired information (for example, the amount of available memory in a database). Furthermore, the CIMOM 810 is configured to "ask" for and receive such information from a WBEM provider 820. Although FIG. 8 illustrates a single WBEM server 805 with a CIMOM 810 therein, it should be understood that multiple WBEM servers 805, each with a CIMOM 810, are operable in the WBEM architecture 800 to access various different managed devices 840 in accordance with different CIM schemas. The CIM standard also can be found at http://www.dmtf.org.

WBEM Client

Each WBEM client 830 provides an interface between a manager 850 and the CIMOM 810. The WBEM client 830 can include management applications to monitor and control one or more managed devices 840. If a WBEM client 830 wishes to modify or access data from one of the managed devices 840, the CIMOM 810 is responsible for calling the correct WBEM provider 820 associated with such a managed device 840. In turn, the correct WBEM provider 820 modifies or accesses the particular managed device 840 in accordance with the request from the WBEM client 830.

A standard protocol called CIM Operations over HTTP is employed for communication between each WBEM client 830 and the CIMOM 810, as illustrated in FIG. 8. All CIM information exchanged between the WBEM clients 830 and the WBEM server 805 are CIM messages, which are protocol independent and include CIM operations. CIM messages can be transmitted using any protocol. However, HTTP is chosen as a standard for CIM operations because of its wide usage on the Internet, reliability running on top of TCP/IP, and security when HyperText Transport Protocol Secured (HTTPS) is used. Accordingly, as noted earlier, one of the standards of WBEM is CIM Operations over HTTP, which provides a specification of how to exchange CIM information over the HTTP by defining all CIM operations allowed in the CIM messages. A CIM operation can be a simple method for a defined class in a CIM schema or one of the operations for manipulating CIM data predefined in the "CIM Operations over HTTP" specification.

WBEM Provider

Each WBEM provider 820 can be implemented by programming code to provide an interface between one or more managed resources or devices 840 and the WBEM server 805. It is suitably configured to extract information from the various managed devices 840 with which it may be associated. For example, in a multi-disc or tape database, a database provider is configured to obtain necessary information from each object in the database. Such information might include available memory, file allocations, and other information. Although FIG. 8 depicts a single managed device 840 associated each WBEM provider 820, it should be understood that each WBEM provider 820 is capable of extracting information from more than one managed device 840. Similar to a network element 230 in FIG. 3, each managed device 840 is a MO representing a physical device such as host, routers, gateways, terminal servers, and the like that are typically found in an IT network. The WBEM providers 820 and the CIMOM 810 can reside on the same computer system, such as the WBEM server 805 depicted in FIG. 8. Alternatively, the WBEM providers 820 and the CIMOM 810 reside on different computer systems. Unlike the communication between a WBEM client 830 and the WBEM server 805, communication between the WBEM providers 820 and their associated managed devices 840 is proprietary or specific to each managed device 840.

The WBEM server 805 further includes a CIM-XML protocol adapter 815, and CIM-XML indication handler 817. The WBEM server 805 receives and processes CIM operation message requests from the WBEM clients 830 and issues CIM operation message responses back to the WBEM clients 830. The CIM-XML indication handler 817 receives indications, or event notifications, at one or more of the managed devices 840, performs the mapping between the internal representation of each CIM indication and the desired format (such as XML) and protocol (such as HTTP), and sends such CIM indication to the designated destination (such as one of the managers 850). The CIM-XML protocol adapter 815 enables the CIMOM 810 to communicate with the WBEM clients 830 using CIM Operations over HTTP, which is further described later as well.

Integration of WBEM and OPC Architectures

It is also possible to employ the WBEM and OPC architectures together to integrate an IT network with a FM network in an information architecture in order to also provide communication between the IT management software and facility management software for the exchange of network information.

Figure 9A:
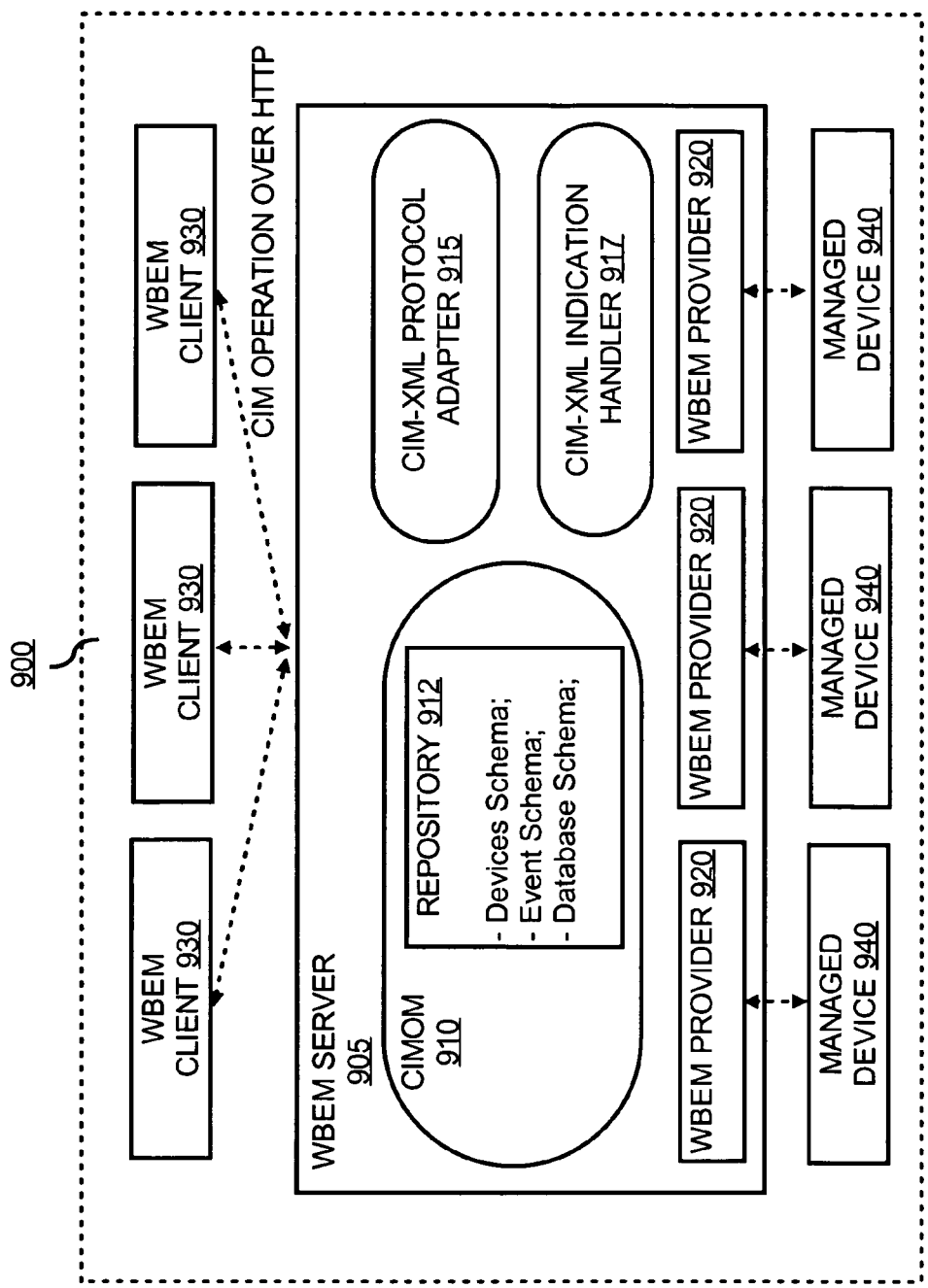
FIGS. 9A-B illustrate an integration of a WBEM architecture of an IT network with an OPC architecture of a facility management network.
Figure 9B:
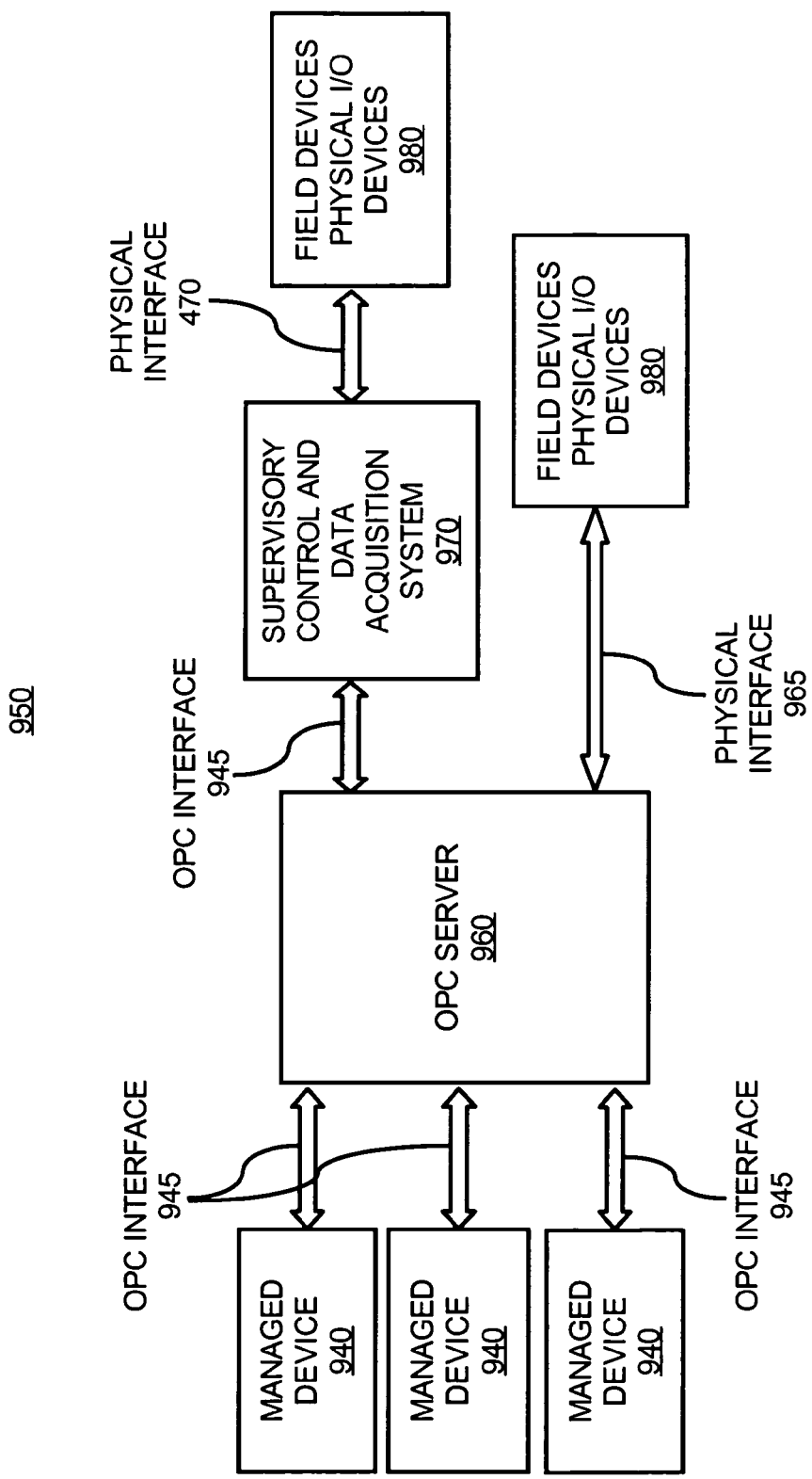

FIGS. 9A-B illustrate a WBEM architecture 910 for an IT network integrating with an OPC architecture 950 for a physical environment, such as a FM network, to enable user access to the FM network from the IT network, in accordance with an embodiment. Similar to the WBEM architecture 800 in FIG. 8, the WBEM architecture 900 for the IT network includes a WBEM server 905 and one or more WBEM clients 930 that operating in a similar manner to the WBEM clients 830. The WBEM server 905 includes a CIMOM 910, a CIM-XML protocol adapter 915, a CIM-XML indication handler 917, and one or more WBEM providers 920. Within the CIMOM 910 is a repository 912 for storing CIM schemas for managing both the IT network and the FM network as represented by the OPC architecture 950. Thus, the repository 912 not only stores the CIM schema for "Network" to access and manage the IT network, but it also stores one or more standard CIM schemas for "Devices" to access and manage field devices in the FM network through the available OPC DataAccess functionality of the OPC architecture for the FM network, one or more standard CIM schemas for "Event" to be notified of events and conditions in the FM network through the available OPC Alarm&Event functionality of the OPC architecture for the FM network, and one or more standard CIM schemas for "Database" to access any historical database in the FM network through the available OPC HistoricalData functionality of the OPC architecture for the FM network.

In each CIM Devices schema, the CIM classes are defined in accordance with the existing OPC server objects for the DataAccess functionality in the OPC server 960 in order to maintain information about such OPC server. Likewise, the CIM subclasses are defined in accordance with the existing OPC group objects for the DataAccess functionality in the OPC server 960, and the CIM instances are defined in accordance with the existing OPC item objects for the DataAccess functionality in the OPC server 960 that represent connections to the field devices and other physical I/O devices 430 and 440. In one embodiment, the field devices of management interest to users of the IT network are related to the cooling infrastructure, such as HVAC systems, in the FM network. Similar to the creation of the CIM Devices schema, each CIM Event schema is created by defining its CIM classes (and subclasses) and instances in accordance with the existing OPC programming objects for the Alarm&Event functionality of the OPC server 960. Likewise, each CIM Database schema is created by defining its CIM classes (and subclasses) and instances in accordance with the existing OPC programming objects for the HistoricalData functionality of the OPC server 960.

Similar to the OPC architecture 400 in FIG. 4, the OPC architecture 950 includes an OPC server 960, which is coupled to one or more OPC interfaces 965 for transferring data as received from a control system, such as the SCADA system 970, to one or more WBEM providers 920 in the WBEM architecture 910. The WBEM providers 920 act as OPC client applications to gather data in order to provide the necessary objects in the CIM schemas stored in the repository 912 of the WBEM architecture 920 that represent the FM network and the field devices 980 being managed therein.

Figure 10:
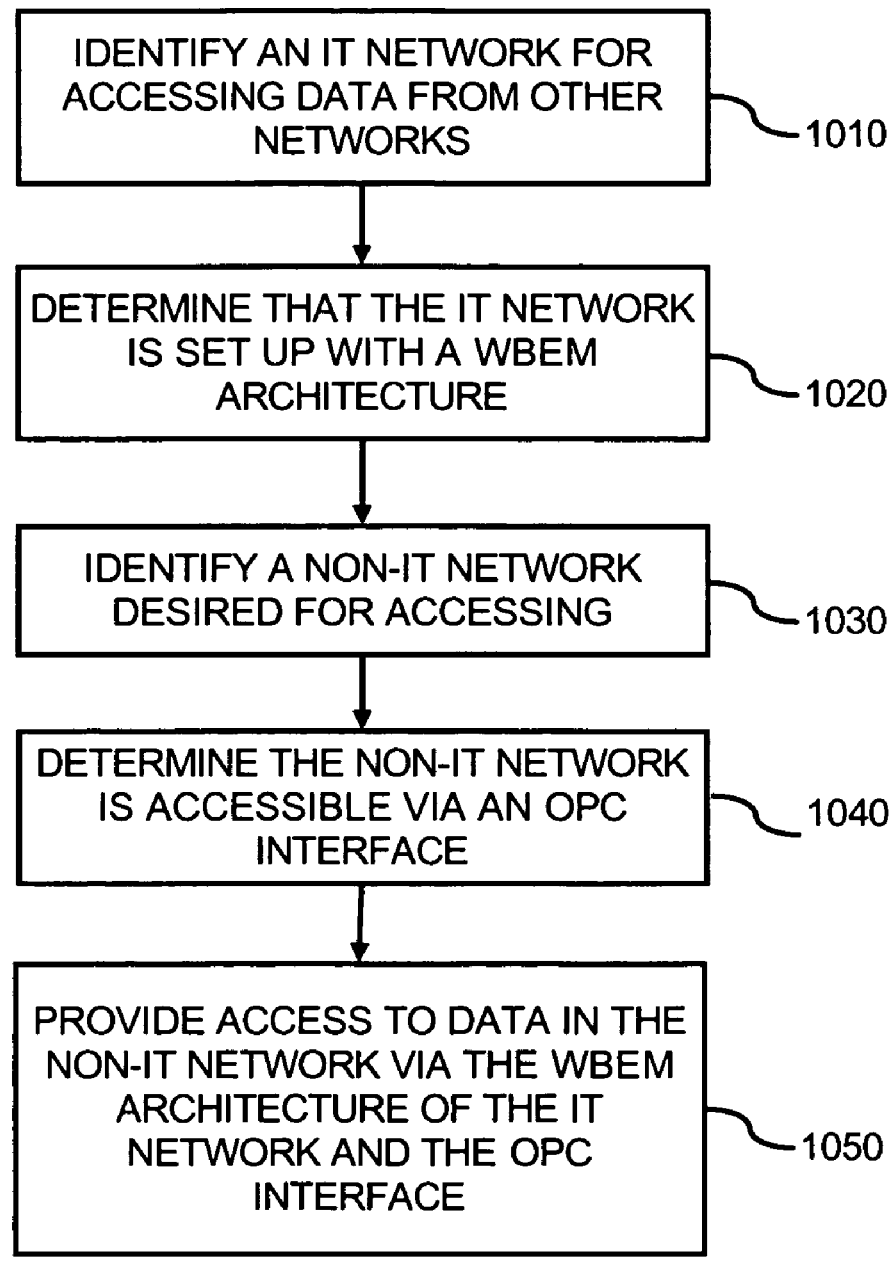
FIG. 10 illustrate a process flow for integrating IT data and non-IT data in accordance with another embodiment of the present invention.

FIG. 10 illustrates a process 1000 for integrating facilities data, or any other non-IT data from a non-IT network, such as a FM network, with IT data in an IT network via the integrated WBEM-OPC architecture depicted in FIGS. 9A-B.

At 1010, an IT network of a desired physical environment to be monitored is identified and chosen as the IT network for accessing data from other networks, IT or non-IT. The identification can be done manually by the user upon observing and analyzing the physical environment. Alternatively, the identification can be done by an IT network management software, running on a computerized system that is connected to the IT network for analysis.

At 1020, it is determined whether a WBEM architecture has been set up for the IT network. In one embodiment, the IT network management software that could identify the IT network may have been used to set up the WBEM architecture for the IT network. Thus, an identification of such a management software would indicate that a WBEM architecture for the IT network has been set up for the IT network. Otherwise, an IT network management software, such as a HP WBEM Services Software Developers Kit, can be used to set up the WBEM architecture for the IT network.

At 1030, an interested non-IT network of the physical environment is identified. This can be accomplished by using any commercially-available management software or one associated with such a non-IT network. For example, if the interested non-IT network is a facility management network, a commercially-available management software such as Siemens APOGEE can be used.

At 1040, it is determined whether the interested non-IT network is accessible via an OPC interface. This determination can be done manually by the user checking to see, for example, whether there exists an OPC server providing an OPC interface. Alternatively, this determination can be automated through implementation of a software program at the IT network to determine whether communication can be established with an OPC server at the non-IT network or interfacing with the non-IT network. If an OPC interface is not available, an OPC interface should be set up in a manner described earlier with reference to FIG. 6 so that a SNMP proxy agent subsequently can be set up at the IT network to access the OPC interface and the non-IT network beyond.

At 1050, the user is provided access to the non-IT network and data therein via the WBEM architecture 910 set up for the IT network and the OPC architecture 950 set up for the non-IT network.

With facilities data available through the CIM schemas stored in the repository 912 and WBEM providers 920 of the WBEM architecture 910, IT personnel is able to access and use feedback of such data to better understand the environmental effects of IT application deployments, such as thermal effects and power consumption, and make better decisions on how to deploy IT applications for energy-efficient thermal management.

In operation, users wishing to access or manage the IT network, FM network, or both via the WBEM architecture 910 in FIGS. 9A-B are provided with a user interface, such as a graphical user interface (GUI), a browser user interface (BUI), or a command-line interface (CUI), which is independent of the WBEM architecture. The user interface communicates with the WBEM clients 930 through a set of APIs. Depending on the origination of the user request, one or more WBEM clients 930 then construct a CIM message with the user request. For example, in accordance with the CIM in XML standard of the WBEM architecture 910, an XML message is constructed with the user request.

Next, the WBEM client 930 uses a communication protocol, such as HTTP (or HTTPS) in accordance with the CIM Operations over HTTP standard, to send the CIM-XML encoded user request to a corresponding WBEM server 905, which uses the CIM-XML protocol adapter 915 to communicate with the WBEM client 930 using CIM Operations over HTTP. While using the HTTPS WBEM connection, it is important for the WBEM client 930 to verify and authenticate unknown WBEM certifications before accepting them as valid certificates.

Next, The WBEM server 905 decodes the user request passed by the WBEM client 930, as facilitated by the CIM-XML protocol adapter 915, performs the required authentication and authorization checks to ensure it is a valid system login for an authorized user, and consults the CIMOM 910 and the repository 912 therein for a previously-created CIM schema of a managed device 940 to see how the user request should be handled. Only valid CIM operations are accepted. For example, the CIMOM 910 determines from a previously-created CIM schema that it needs to communicate with one or more managed devices 940 (hardware or software) to satisfy the user request. This communication is handled by the WBEM providers 920 as noted earlier.

After receiving the user request from the WBEM CIMOM 910, each WBEM provider 940 is responsible for any additional user authorization, for performing the action relating to the user request, and for returning a response to the CIMOM 910, which then sends the response back to the WBEM client 930 and onward to the manager 950 that initiated the user request.

The WBEM architecture 900 also allows a managed device 940 to initiate communication with one of the managers 950 for event notification. An event is the occurrence of a phenomenon of interest. An event can be defined to indicate, for example, the occurrence of a disk write error, a failed authentication attempt, or a even a mouse click. The CIM-XML indication handler 917 within the WBEM server 905 uses CIM-XML format (or any format used by the CIMOM 910 and the WBEM clients 930 to send an indication representing an event notification to a specified manager 950 as the destination.

What has been described and illustrated herein are embodiments along with some of their variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. An information architecture for a data center containing a plurality of IT network devices, the information architecture including a facility management (FM) network and an information technology (IT) network, wherein:
   a) the FM network comprises,
   a cooling infrastructure having a plurality of field devices for providing cooling resources to the plurality of IT network devices;
   at least one server based on Object Linking and Embedding for Process Control (OPC) providing OPC interfaces to the plurality of field devices;
   b) the IT network comprises,
   the plurality of IT network devices;
   a computerized system operable to implement Simple Network Management Protocol (SNMP) to manage the plurality of IT network devices; and
   the computerized system further implementing SNMP for managing the plurality of IT network devices in order to access the OPC interfaces and thereby enable coordinated thermal management and utility computing management in the data center and wherein the computerized system is operable to implement SNMP to access the OPC interfaces through a SNMP proxy agent having a plurality of SNMP proxy sub-agents to gain access to the plurality of field devices of the cooling infrastructure, wherein the plurality of SNMP proxy sub-agents contain respective management information bases (MIBs) that contain managed objects of the plurality of field devices.

2. The information architecture of claim 1, wherein:
the at least one OPC-based server comprises at least one OPC programming object providing a connection to the at least one field device in the FM network; and
the SNMP proxy agent includes an identification of the at least one OPC programming object to identify the plurality of field devices in the FM network to the IT network.

3. The information architecture of claim 1, wherein the IT network further comprises:
a first database containing at least one characteristic of the plurality of IT network devices, the first database is a first management information base (MIB) for supporting the plurality of SNMP proxy sub-agents; and
a second database containing an OPC programming object, as stored in the at least one OPC-based server, for the plurality of field devices in the cooling infrastructure; wherein the second database is a MIB subset of the first MIB that provides an extension to the first MIB.

4. The information architecture of claim 1, wherein the plurality of field devices in the FM network comprise one or more of: a human machine interface, an air conditioning unit, a fan, a programmable logic controller, a variable frequency drive, a temperature sensor, a power distribution unit, and an uninterruptible power supply.

5. A method for coordinated thermal management and utility computing management in a data center, comprising:
first identifying a non-IT network for accessing non-IT data, wherein the non-IT network comprises a cooling infrastructure having a plurality of field devices for providing cooling resources to a plurality of IT network devices and at least one server based on Object Linking and Embedding for Process Control (OPC) providing an OPC interface to the at least one field device;
second identifying an IT network from which to access the non-IT data from the non-IT network, wherein the IT network comprises the plurality of IT network devices and a computerized system operable to implement Simple Network Management Protocol (SNMP) to manage the plurality of IT network devices, wherein the computerized system is operable to implement SNMP to access the OPC interface through a SNMP proxy agent having a plurality of SNMP proxy sub-agents to gain access to the plurality of field devices, wherein the plurality of SNMP proxy sub-agents contain respective management information bases (MIBs) that contain managed objects of the plurality of field devices;
first determining that the non-IT network is accessible via at least one interface based on OPC for accessing at least one field device in the non-IT network;
second determining that the IT network includes an architecture capable of implementing SNMP for managing at least one device in the IT network; and
providing coordinated thermal management of the at least one plurality of field devices and utility computing management of the plurality of IT network devices through access to data of the plurality of field devices in the non-IT network by the IT network based on the second determining.

6. The method of claim 5, wherein the first determining comprises:
determining that there already exists the at least one OPC-based interface for accessing the plurality of field devices in the non-IT network.

7. The method of claim 5, wherein the first determining comprises:
determining that there does not exist the at least one OPC-based interface for accessing the plurality of field devices in the non-IT network; and
setting up the at least one OPC-based interface for the non-IT network to include at least one OPC programming object identifying the plurality of field devices in the non-IT network.

8. The method of claim 5, wherein:
a) first determining includes determining that the OPC-based interfaces includes at least one OPC programming object providing a connection to the plurality of field devices in the non-IT network; and
b) providing the IT network with access to data includes:
setting up the SNMP proxy agent in the IT network;
storing the at least one OPC programming object in a database of the SNMP proxy agent; and
providing the IT network with access to the data of the plurality of field devices in the non-IT network by accessing the at least one OPC programming object through its identification stored in the database of the SNMP proxy agent.

9. The method of claim 5, wherein:
the first determining comprises determining that the at least one OPC-based interface includes a plurality of OPC servers, each of the plurality of OPC servers provides an interface for accessing one of the plurality of field devices; and
providing the IT network with access to data comprises accessing the SNMP-capable architecture of the IT network to access the plurality of OPC servers in order to access data in the field devices with which the plurality of OPC servers are interfaced.

10. The method of claim 5, wherein the plurality of field devices in the non-IT network comprise one or more of: a human machine interface, an air conditioning unit, a fan, a heat pump, a programmable logic controller, a variable frequency drive, a temperature sensor, a power distribution unit, and an uninterruptible power supply.

11. A computer-readable medium on which is encoded program code for a method for coordinate thermal management and utility computing management in a data center, the program code comprising:
program code for first identifying a non-IT network for accessing non-IT data, wherein the non-IT network comprises a cooling infrastructure having a plurality of field devices for providing cooling resources to a plurality of IT network devices and at least one server based on Object Linking and Embedding for Process Control (OPC) providing an OPC interface to the plurality of field devices;
program code for second identifying an IT network from which to access the non-IT data from the non-IT network, wherein the IT network comprises the plurality of IT network devices and a computerized system operable to implement Simple Network Management Protocol (SNMP) to manage the plurality of IT network devices;
program code for first determining that the non-IT network is accessible via at least one interface based on OPC for accessing the plurality of field devices in the non-IT network;
program code for second determining that the IT network includes an architecture capable of implementing SNMP for managing at least one device in the IT network, wherein the computerized system is operable to implement SNMP to access the OPC interface through a SNMP proxy agent having a plurality of SNMP proxy sub-agents to gain access to the plurality of field devices of the cooling infrastructure, wherein the plurality of SNMP proxy sub-agents contain respective management information bases (MIBs) that contain managed objects of the plurality of field devices; and program code for providing coordinated thermal management of the plurality of field devices and utility computing management of the plurality of IT network devices through access to data of the plurality of field devices in the non-IT network by the IT network based on the second determining.

12. The computer-readable medium of claim 11, wherein:
a) first determining includes determining that the OPC-based interfaces includes at least one OPC programming object providing a connection to the plurality of field devices in the non-IT network; and
b) providing the IT network with access to data includes:
setting up the SNMP proxy agent in the IT network;
storing the at least one OPC programming object in a database of the SNMP proxy agent; and
providing the IT network with access to the data of the plurality of field devices in the non-IT network by accessing the at least one OPC programming object through its identification stored in the database of the SNMP proxy agent.

13. The computer-readable medium of claim 11, wherein the plurality of field devices in the non-IT network include one of: a human machine interface, a programmable logic controller, a variable frequency drive, a temperature sensor, a power distribution unit, and an uninterruptible power supply.

14. The computer-readable medium of claim 11, wherein the OPC server is one of: an OPC-based server for accessing current data from the non-IT network, an OPC-based server for handling alarms and events in the second network, and an OPC-based server for accessing historical data from the non-IT network.

15. An information architecture for a data center containing a plurality of IT network devices, the information architecture including a facility management (FM) network and an information technology (IT) network, wherein:
a) the FM network comprises,
a cooling infrastructure having at least one field device for providing cooling resources to the plurality of IT network devices;
at least one server based on Object Linking and Embedding for Process Control (OPC) providing an OPC interface to the at least one field device;
b) the IT network comprises,
the plurality of IT network devices;
a computerized system operable to implement Web Based Enterprise Management (WBEM) to manage the plurality of IT network devices; and
the computerized system further implementing WBEM for managing the plurality of IT network devices in order to access the OPC interface so as to gain access to the plurality of field devices of the cooling infrastructure and thereby enable coordinated thermal management and utility computing management in the data center.

16. The information architecture of claim 15, wherein the computerized system is operable to implement WBEM to access the OPC interface through application of at least one Common Information Model (CIM) schema.

17. The information architecture of claim 15, wherein the IT network further comprises:
a WBEM server storing a Common Information Model (CIM) schema for accessing and managing the IT network and at least one other CIM schema for accessing and managing the FM network, including the at least one field device therein.

18. The information architecture of claim 15, wherein the at least one field device in the FM network comprises one or more of: a human machine interface, an air conditioning unit, a fan, a programmable logic controller, a variable frequency drive, a temperature sensor, a power distribution unit, and an uninterruptible power supply.

* * * * *

UNITED STATES PATENT AND TRADEMARK OFFICE
CERTIFICATE OF CORRECTION

| | |
|---|---|
| PATENT NO. | : 8,051,156 B1 |
| APPLICATION NO. | : 11/495360 |
| DATED | : November 1, 2011 |
| INVENTOR(S) | : Ratnesh Sharma et al. |

It is certified that error appears in the above-identified patent and that said Letters Patent is hereby corrected as shown below:

In column 17, line 60-61, in Claim 5, delete "at least one plurality" and insert -- plurality --, therefor.

Signed and Sealed this
Twentieth Day of November, 2012

David J. Kappos
*Director of the United States Patent and Trademark Office*